United States Patent
Zhou et al.

(10) Patent No.: US 10,924,002 B2
(45) Date of Patent: Feb. 16, 2021

(54) TRANSIENT RESPONSE ENHANCEMENT CIRCUIT FOR BUCK-TYPE VOLTAGE CONVERTERS

(71) Applicant: University of Electronic Science and Technology of China, Chengdu (CN)

(72) Inventors: Zekun Zhou, Chengdu (CN); Junyuan Rong, Chengdu (CN); Zuao Wang, Chengdu (CN); Yue Shi, Chengdu (CN); Zhuo Wang, Chengdu (CN); Bo Zhang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 16/676,470

(22) Filed: Nov. 7, 2019

(65) Prior Publication Data

US 2020/0389088 A1  Dec. 10, 2020

(30) Foreign Application Priority Data

Jun. 5, 2019 (CN) .......................... 201910485976.5

(51) Int. Cl.
*H02M 1/32* (2007.01)
*H02M 3/04* (2006.01)
*H02M 3/156* (2006.01)

(52) U.S. Cl.
CPC .............. *H02M 1/32* (2013.01); *H02M 3/04* (2013.01); *H02M 3/156* (2013.01)

(58) Field of Classification Search
CPC ........... H02M 3/155–1588; H02M 2001/0032; H02M 1/32; H02M 2001/325
See application file for complete search history.

(56) References Cited

U.S. PATENT DOCUMENTS

| | | | |
|---|---|---|---|
| 2014/0035544 A1* | 2/2014 | Chen ..................... | H02M 3/158 323/271 |
| 2018/0375320 A1* | 12/2018 | Ho ......................... | H02M 1/32 |
| 2019/0252968 A1* | 8/2019 | Li .......................... | H02M 3/158 |

OTHER PUBLICATIONS

Y. Hsu, C. Ting, L. Hsu, J. Lin and C. C. Chen, "A Transient Enhancement DC-DC Buck Converter With Dual Operating Modes Control Technique," in IEEE Transactions on Circuits and Systems II: Express Briefs, vol. 66, No. 8, pp. 1376-1380, Aug. 2019. (Year: 2019).*

* cited by examiner

*Primary Examiner* — Peter M Novak

(74) *Attorney, Agent, or Firm* — Bayramoglu Law Offices LLC

(57) ABSTRACT

A transient response enhancement circuit for buck-type voltage converters, wherein, the transient load changing detecting module detects the output voltage of the buck-type voltage converter. The first control signal is generated when the increase of the output voltage is detected, and the second control signal is generated when the decrease of the output voltage is detected, thereby self-adaptively detecting the time of the buck-type voltage converter in response to the load changing. The compensation voltage predicting operation module predicts and adjusts the compensation voltage and the adjusted compensation voltage is superimposed on the buck-type voltage converter through the internal active compensation module to adjust the duty ratio of the buck-type voltage converter. The drive controlling insertion logic module can further improve the response speed.

6 Claims, 2 Drawing Sheets

TRANSIENT RESPONSE ENHANCEMENT CIRCUIT FOR BUCK-TYPE VOLTAGE CONVERTERS

CROSS REFERENCE TO THE RELATED APPLICATIONS

This application is based upon and claims priority to Chinese Patent Application No. CN201910485976.5, filed on Jun. 5, 2019, the entire contents of which are incorporated herein by reference.

TECHNICAL FIELD

The present disclosure belongs to the field of basic electronic circuits, and more particularly relates to a transient response enhancement circuit for buck-type voltage converters.

BACKGROUND

In order to adjust the output voltage, the system of the buck-type transformer, except for the hysteresis-mode voltage converter, generally adjusts the output voltage indirectly by adjusting the duty cycle. However, the duty cycle of the system generally does not change quickly because the output voltage fluctuation caused by load changing, which is essentially due to the output current of the system, cannot be quickly and stably changed following the change of load.

In order to accelerate the adjustment of output current, a zero point is usually introduced into the loop in the existing system to speed up the loop response and to improve the system cutoff frequency. However, in order to ensure the stability of the system, the excessively high cutoff frequency should be avoided when the system is designed. Generally speaking, improving the response speed of the system needs to increase the working frequency, which increases the switching loss.

The power supply in response to the load is divided into response time and recovery time. Up to now, there have been many methods for shortening the response time of the system and reducing the output voltage overshoot or undershoot which is generated owing to the load changes, but nonetheless, the method for optimizing recovery time is still relatively scarce and is mostly achieved by increasing the system cutoff frequency.

SUMMARY

In order to solve the problems of traditional buck-type voltage converters such as the low cutoff frequency and the long recovery time during load switching or load changing, the present disclosure solves the problem of traditional buck-type voltage converters such as low cutoff frequency and long recovery times by providing a transient response enhancement circuit. The moment of load current changing can be detected by detecting the moment when the output voltage of the buck-type voltage converter abnormally changes, without affecting the characteristics of the loop and the stability of the original system. Then, the appropriate level of the compensation voltage can be predicted by self-adaptively according to the external input-output conditions and the response time of transient load changing and compensated into the buck-type voltage converter, which finally accelerates the recovery rate of the system, equivalently realizes the adjustment of the system dynamic bandwidth, accelerates the transient response and recovery of the buck-type voltage converter system, reduces the voltage fluctuation caused by the loop adjustment, optimizes the bandwidth of the buck-type voltage converter in the transient load changing process, and improves the cutoff frequency of the system.

The technical solution of the present disclosure is as follows.

A transient response enhancement circuit for buck-type voltage converters includes a transient load changing detecting module, a compensation voltage predicting operation module and an internal active compensation module.

The transient load changing detecting module detects an output voltage of the buck-type voltage converter, and generates a first control signal when an increase of the output voltage of the buck-type voltage converter is detected.

When the first control signal is generated, if the buck-type voltage converter changes from a heavy load to a light load, the lower power tube in the buck-type voltage converter is controlled to be turned on. If the buck-type voltage converter changes from the light load to the heavy load, the upper power tube in the buck-type voltage converter is controlled to be turned on.

The compensation voltage predicting operation module includes a transconductance amplifier, a first buffer, a second buffer, a first capacitor, a first switch, a second switch and a third switch.

A transconductance of the transconductance amplifier is adjustable. A differential input voltage of the transconductance amplifier is a voltage-dividing value of a voltage difference between a switching node voltage of the buck-type voltage converter and an output voltage of the buck-type voltage converter. An output end of the transconductance amplifier is connected to one end of the first switch.

One end of the second switch is connected to the other end of the first switch and an input end of the first buffer and is grounded through the first capacitor, and the other end of the second switch is connected to an output end of the second buffer.

One end of the third switch is connected to an output end of the first buffer, and the other end of the third switch is connected to an input end of the second buffer and serves as an output end of the compensation voltage predicting operation module.

When the first control signal is generated, the first switch and the third switch are turned on and the second switch is turned off. Otherwise, the first switch and the third switch are turned off and the second switch is turned on.

An input end of the internal active compensation module is connected to the output end of the compensation voltage predicting operation module, and an output end of the internal active compensation module is connected to an output end of an error amplifier in the buck-type voltage converter.

Specifically, the transient load changing detecting module also generates a second control signal when a decrease of the output voltage of the buck-type voltage converter is detected.

The transient response enhancement circuit further includes a drive controlling insertion logic module. When the buck-type voltage converter is in a control mode of periodically turning on the upper power tube, the drive controlling insertion logic module is configured to turn on the upper power tube in the buck-type voltage converter when the second control signal is generated.

When the buck-type voltage converter is in a control mode of periodically turning on the lower power tube, the drive controlling insertion logic module is configured to turn on the lower power tube in the buck-type voltage converter when the second control signal is generated.

Specifically, the compensation voltage predicting operation module further includes a voltage-dividing resistor, a first controllable current source and a second controllable current source.

One end of the voltage-dividing resistor is connected to a bias voltage and a negative input end of the transconductance amplifier, and the other end of the voltage-dividing resistor is connected to a positive input end of the transconductance amplifier and is grounded through the first controllable current source.

A current value of the first controllable current source is $$\frac{VO - SW}{xR},$$

where, VO is the output voltage of the buck-type voltage converter, SW is the voltage at the switching node of the buck-type voltage converter, R is the resistance value of the voltage-dividing resistor, and x is the voltage-dividing ratio.

The second controllable current source is configured to adjust the transconductance of the transconductance amplifier.

Specifically, the internal active compensation module is equivalent to a type II compensation structure including a compensation capacitor. The compensation capacitor is a large capacitor and can be converted into a small capacitor when the first control signal is generated.

The advantages of the present disclosure are as follows. The present disclosure can self-adaptively detect the time of the buck-type voltage converter in response to the load changing, self-adaptively adjust the level of the compensation voltage (Vcomp) according to this time, and predict a new steady-state operating point of the compensation voltage, thereby dynamically increasing the working bandwidth of the buck-type voltage converter, accelerating the transient response and recovery of the buck-type voltage converter system and reducing the voltage fluctuation caused by the loop adjustment. The drive controlling insertion logic module can further accelerate the response speed. In the present disclosure, the stability, operating frequency or zero-pole distribution of the existing loop of the buck-type voltage converter is insusceptible, and there is no need to add extra pins outside the chip. The present disclosure can be widely applied to all buck-type voltage converters.

DETAILED DESCRIPTION OF THE EMBODIMENTS

The present disclosure will be further described below in conjunction with the drawings and specific embodiments.

Figure 1:
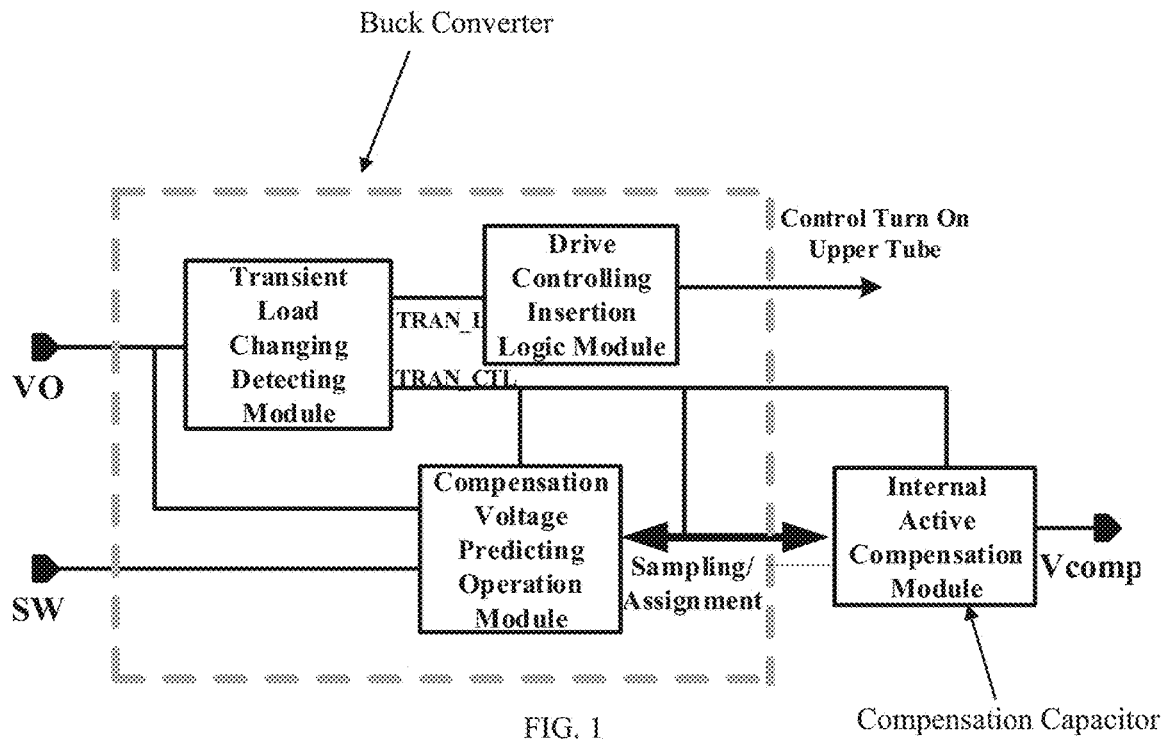
FIG. 1 is a topology structure diagram of a transient response enhancement circuit for buck-type voltage converters according to the present disclosure.

As shown in FIG. 1, a topology structure diagram of a transient response enhancement circuit for buck-type voltage converters includes a transient load changing detecting module, a compensation voltage predicting operation module and an internal active compensation module. Two input ends of the circuit shown in FIG. 1 are connected to the voltage values VO and SW, wherein the VO is the output voltage of the buck-type voltage converter, and SW is the voltage at the connection point of the upper power tube and the lower power tube in the buck-type voltage converter. When the upper power tube is turned on, the voltage SW is the input voltage Vin of the buck-type voltage converter. When the lower power tube is turned on, the voltage SW is the grounded voltage GND.

The transient load changing detecting module detects the magnitude changing of the load by detecting whether the output voltage VO of the buck-type voltage converter changes, thereby accelerating the response rate of the system. That is, the load changing is determined according to the changes of the slope rate of the output voltage VO. When the increase of the output voltage VO of the buck-type voltage converter is detected, the first control signal TRAN_CTL is generated. In other words, the first control signal TRAN_CTL is a high level when the output voltage VO of the buck-type voltage converter increases, and the first control signal TRAN_CTL is a low level when the output voltage VO of the buck-type voltage converter decreases or remains unchangeable. The first control signal TRAN_CTL is configured to control the on-off of the first switch S1, the second switch S2 and the third switch S3 in the compensation voltage predicting operation module, thereby changing the operating state of the compensation voltage predicting operation module. The transient load changing detecting module generates a first control signal as a high level when detecting the increase of the output voltage VO and meanwhile always turns on the upper power tube or the lower power tube of the buck-type voltage converter. If the buck-type voltage converter changes from a heavy load to a light load, the lower power tube is controlled to be turned on. If the buck-type voltage converter changes from a light load to a heavy load, the upper power tube is controlled to be turned on.

The transient load changing detecting module also generates a second control signal TRAN_L when the decrease of the output voltage VO of the buck-type voltage converter is detected. That is, the second control signal TRAN_L is a high level when the output voltage VO of the buck-type voltage converter decreases, and the second control signal TRAN_L is a low level when the output voltage VO of the buck-type voltage converter increases or remains unchangeable. When the first control signal TRAN_CTL is a low level and the second control signal TRAN_L is a high level, the changing slope rate of the output voltage VO recovers to 0. According to the moment when the detected VO does not change, i.e. the slope rate of the output voltage VO is 0, the transient response time of the buck-type voltage converter system is determined to be over, thereby determining the transient response time of the system. Subsequently, the system enters the transient recovery time, and meanwhile the loop returns to the normal control state.

Figure 3:
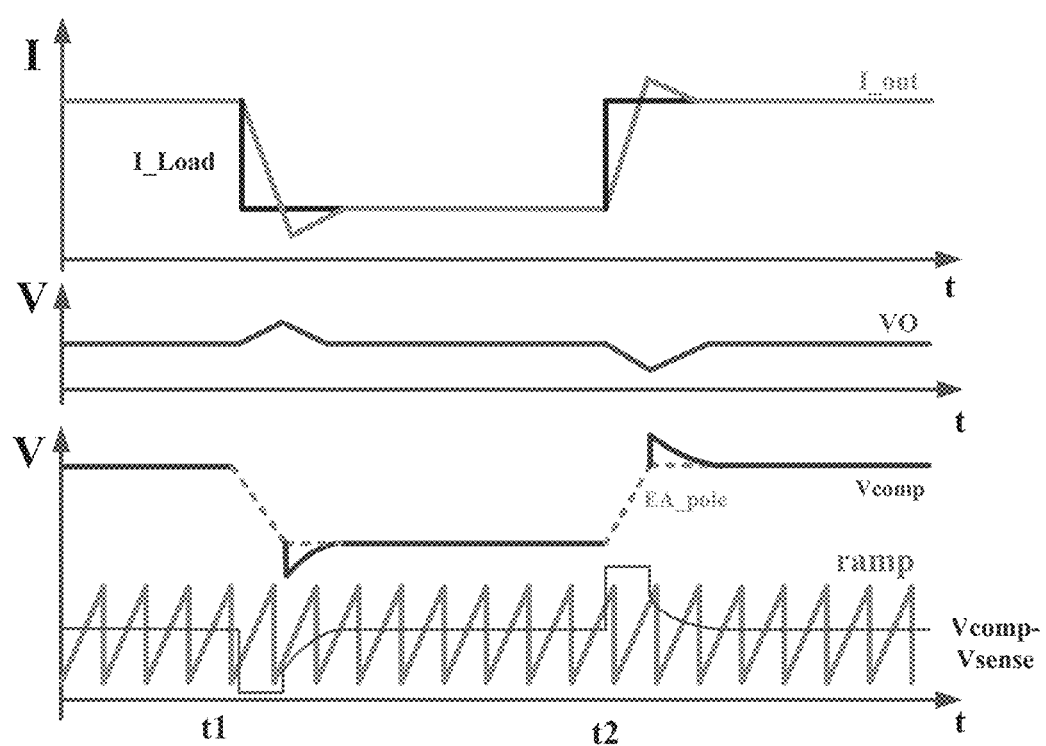
FIG. 3 is an oscillogram of a working signal when the transient response enhancement circuit for the buck-type voltage converters is working in a pulse width modulation current mode of periodically turning on the upper power tube comparator and turning off the lower power tube.

FIG. 3 shows an oscillogram of a working signal when the buck-type voltage converter is under a pulse width modulation current mode of periodically turning on the upper power tube comparator and turning off the lower power tube. In this embodiment, the current mode of the buck-type voltage converter is taken as an example, but actually the present disclosure is also applied to other modes of buck-type voltage converters. The current sampling information is reversely superimposed on the compensation voltage Vcomp. In the figure, I_out is the output current of the buck-type voltage converter, I_Load is the load current of the buck-type voltage converter, Vcomp is the compensation voltage, EA_pole is the steady-state operating point of the error amplifier in the buck-type voltage converter, ramp is the ripple of the buck-type voltage converter, and Vsense is the voltage value of the current sampling information. Under the control of the current mode, the compensation voltage Vcomp superimposing on the output end of the error amplifier in the steady-state buck-type voltage converter, and the superimposing result of the current information are relatively stable when the loads are different. That is, there exists the following relationship before and after the load changes:

$$V_{comp} \; V_{sense} \; 0$$

Where, $V_{comp}$ is the variation value of the compensation voltage Vcomp, and $V_{sens}$ is the variation value of the current sampling information. Moreover, because the upper power tube or the lower power tube of the buck-type voltage converter is controlled to be turned on after the load changing in the transient response enhancement circuit is detected according to the present disclosure, the duty ratio is 100% or 0%, and the magnitude of the variation of the current sampling result can be determined by the time $t_{tran}$ from when the load changing is detected to when the slope rate of the output voltage VO is detected to be zero (the inductor current is equal to the load current). According to the inductance parameters and working conditions of the buck-type voltage converter, the following formula can be obtained.

$$V_{sense}\left(\frac{VO-SW}{L}\right)t_{tran}R_{DCR}A_{sense}$$

where, L is the value of the filter inductor in the buck-type voltage converter, $R_{DCR}$ is the equivalent series parasitic resistance of the external inductor, and $A_{sense}$ is the equivalent sampling gain of the current sampling of the buck-type voltage converter system.

Figure 2:
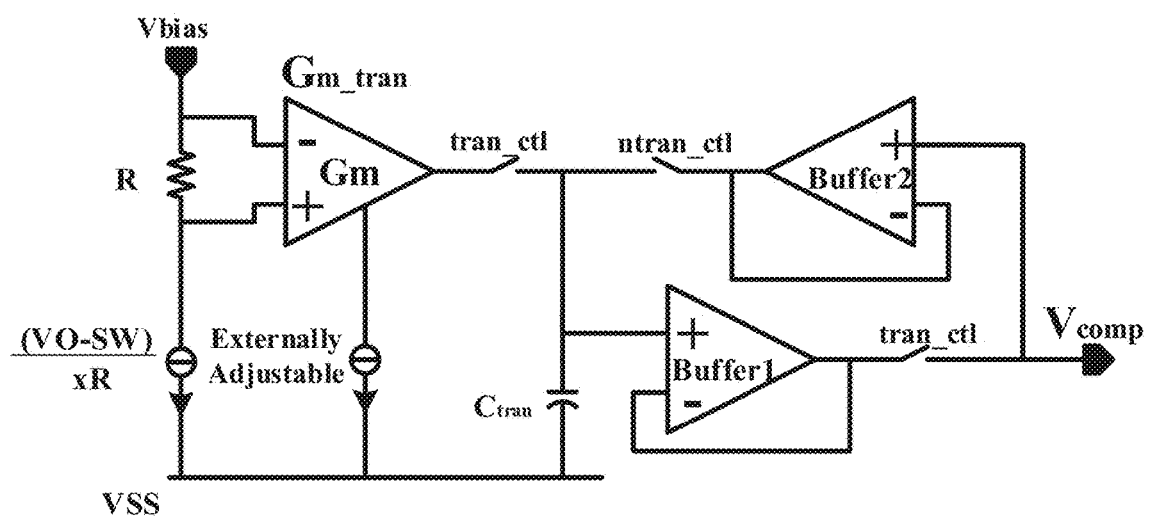
FIG. 2 is a circuit diagram of the compensation voltage predicting operation module in the transient response enhancement circuit for the buck-type voltage converters according to the present disclosure.

From the above analysis, the variation value of the compensation voltage Vcomp under a new steady state can be calculated according to the detected value of the $t_{tran}$. As shown in FIG. 2, the compensation voltage predicting operation module according to the present disclosure includes the transconductance amplifier Gm, the first buffer (Buffer1), the second buffer (Buffer2), the first capacitor $C_{tran}$, the first switch S1, the second switch S2 and the third switch S3. A transconductance of the transconductance amplifier Gm is adjustable, and a differential input voltage of the transconductance amplifier Gm is a voltage-dividing value of the voltage difference between the switching node voltage SW of the buck-type voltage converter and the output voltage VO of the buck-type voltage converter, and an output end of the transconductance amplifier Gm is connected to one end of the first switch S1. One end of the second switch S2 is connected to the other end of the first switch S1 and an input end of the first buffer (Buffer1) and is grounded through the first capacitor $C_{tran}$, and the other end of the second switch S2 is connected to an output end of the second buffer (Buffer2). One end of the third switch S3 is connected to an output end of the first buffer (Buffer1), and the other end of the third switch S3 is connected to an input end of the second buffer (Buffer2) and serves as an output end of the compensation voltage predicting operation module. The first control signal TRAN_CTL controls the first switch S1 and the third switch S3, and the inverted signal NTRAN_CTL of the first control signal controls the second switch S2. When the first control signal TRAN_CTL is a high level, the inverted signal NTRAN_CTL of the first control signal is a low level, and meanwhile the first switch S1 and the third switch S3 are turned on and the second switch S2 is turned off. When the first control signal TRAN_CTL is a low level, the inverted signal NTRAN_CTL of the first control signal is a high level, and meanwhile the first switch S and the third switch S3 are turned off and the second switch S2 is turned on. The differential input voltage of the transconductance amplifier Gm can be provided by the voltage-dividing resistor R and the first controllable current source. One end of the voltage-dividing resistor R is connected to the bias voltage Vbias and the negative input end of the transconductance amplifier Gm, and the other end of the voltage-dividing resistor R is connected to the positive input end of the transconductance amplifier Gm and is grounded through the first controllable current source. The current value of the first controllable current source is $$\frac{VO-SW}{xR},$$

where, VO is the output voltage of the buck-type voltage converter, SW is the voltage at the switching node of the buck-type voltage converter, R is the resistance value of the voltage-dividing resistor, and x is the voltage-dividing ratio. The first controllable current source converts the voltage difference VO-SW between the output voltage VO of the buck-type voltage converter and the voltage SW at the switching node into a current, and then converts to the voltage by the voltage-dividing resistor R, thereby scaling the voltage difference VO-SW by x times. In the present disclosure, the transconductance amplifier Gm is a linear transconductance operational amplifier with a large input linear range, and its transconductance $G_{m\_tran}$ is adjustable by the externally adjustable second controllable current source.

In the present disclosure, according to the output voltage VO of the buck-type voltage converter, the voltage SW at the switching node of the buck-type voltage converter, the inductor magnitude L in the buck-type voltage converter, the current sampling gain $A_{sense}$ of the buck-type voltage converter and the transient load changing response time detected by the transient response enhancement circuit, the compensation voltage predicting operation module predicts the level position where the compensation voltage Vcomp is stable under a new operating condition and expedites the stabilization and establishment of the compensation voltage Vcomp after load changes.

Then, the compensation voltage Vcomp, after predicting and adjusting, is superimposed on the output end of the error amplifier of the buck-type voltage converter through the internal active compensation module. Due to the design of the active circuit, the internal active compensation module is equivalent to the type II compensation of the converter system. In the steady-state condition and transient recovery process, the working mode of the internal active compensation module is equivalent to the type II compensation of a large capacitor. When the transient load changing detecting module detects the load changing, the first control signal TRAN_CTL turns into a high level, the working mode of the internal active compensation module changes, and the internal active compensation module is converted into a minimum capacitor by the control of the inner switch of the internal active compensation module, so that the output voltage of the compensation voltage predicting operation module can be quickly assigned to establish a new stable point.

When the output voltage of the buck-type voltage converter is unchanged, the buck-type voltage converter is in the steady state. When the output voltage of the buck-type voltage converter increases, the buck-type voltage converter is in the transient load changing phase. When the output voltage of the buck-type voltage converter decreases, the buck-type voltage converter is in the transient load recovery phase.

In addition, the present disclosure further optimizes the buck-type voltage converter in the Pulse Width Modulation (PWM) control mode. The drive controlling insertion logic module is added to skip the clock signal and in advance turns on the upper power tube or the lower power tube in the buck-type voltage converter when the undershoot of the output voltage VO of the buck-type voltage is detected. The transient load changing detecting module generates the second control signal TRAN_L when the decrease of the output voltage of the buck-type voltage converter is detected. When the buck-type voltage converter is in the control mode of periodically turning on the upper power tube comparator and turning off the lower power tube, the drive controlling insertion logic module is configured to turn on the upper power tube in the buck-type voltage converter provided the second control signal TRAN_L is generated. When the buck-type voltage converter is in the control mode of periodically turning on the lower power tube comparator and turning off the upper power tube, the drive controlling insertion logic module is configured to turn on the lower power tube in the buck-type voltage converter provided the second control signal TRAN_L is generated. The drive controlling insertion logic module is configured to skip the clock signal and in advance turns on the upper power tube or the lower power tube in the buck-type voltage converter when the undershoot of the output voltage VO of the buck-type voltage is detected, so that the loop can obtain information earlier and the response speed is improved.

The specific working process of the present disclosure is as follows.

In the steady state condition and transient recovery process, the first control signal TRAN_CTL is a low level. According to the output voltage VO of the buck-type voltage converter, the voltage SW at the switching node of the buck-type voltage converter, the inductor magnitude L in the buck-type voltage converter, the current sampling gain $A_{sense}$ of the buck-type voltage converter and the transient load changing response time detected by the transient response enhancement circuit, the compensation voltage predicting operation module predicts the change value of the compensation voltage Vcomp under a new operation condition. Then, the adjusted compensation voltage Vcomp is stored in the first capacitor $C_{tran}$, and the working mode of the internal active compensation module is equivalent to the type II compensation of a large capacitor, thereby realizing the stability in steady state. When the transient load changing detecting module detects the load changing, the first control signal TRAN_CTL turns into a high level, the working mode of the internal active compensation module changes and the internal active compensation module is equivalent to a minimum capacitor capable of being assigned to the compensation voltage Vcomp. The voltage difference between the output voltage VO and the voltage SW at the switching node is converted into a current through the transconductance $G_{m\_tran}$ of the transconductance amplifier to inject or extract the charge of the first capacitor $C_{tran}$, thereby controlling the linear change of the voltage of the first capacitor $C_{tran}$ related to the voltage VO and the voltage SW. Furthermore, the voltage of the first capacitor $C_{tran}$ is assigned to the compensation voltage Vcomp in real time until the transient response time $t_{tran}$ ends. Finally, the voltage change of the compensation voltage Vcomp is:

$$V_{comp} \frac{(VO-SW)}{xR} R \frac{G_{m\_tran}}{C_{tran}} t_{tran}$$

The values of the value R of the voltage-dividing resistor, the voltage-dividing ratio x, and the transconductance Gm_tran of the transconductance amplifier can be changed appropriately depending on the specific application. In FIG. 2, the transconductance amplifier Gm is a linear transconductance operational amplifier with a large input linear range, and meanwhile the transconductance $G_{m\_tran}$ outside the chip is adjustable. When the value of the transconductance Gm_tran of the transconductance amplifier Gm and the value of the first capacitor $C_{tran}$ is adjusted to be appropriate values, the compensation voltage Vcomp is equal to the current sampling value Vsense, so as to achieve the prediction of the steady-state operating point. Finally, the generated compensation voltage Vcomp is adjusted to superimpose on the output signal of the error amplifier in the buck-type voltage converter, and the duty cycle of the system can be controlled after the current sampling information is superimposed.

As shown in FIG. 3, at the end of the response time and the beginning of the recovery time, due to the effect of the zero-point resistor in the active compensation module, a small amount of overshoot will be introduced during switching to ensure smooth switching and recovery of the system. The final equivalent result is loop bandwidth expansion to realize the adjustment of system dynamic bandwidth.

From the inspiration according to the present disclosure, those skilled in the art can make other specific modifications and combinations without departing from the spirit and scope of the present disclosure, and these modifications and combinations shall still fall within the scope of the present disclosure.

The invention claimed is:

1. A transient response enhancement circuit for a buck-type voltage converter, comprising a transient load changing detecting module, a compensation voltage predicting operation module and an internal active compensation module; wherein, the transient load changing detecting module detects an output voltage of the buck-type voltage converter, and generates a first control signal when an increase of the output voltage of the buck-type voltage converter is detected;

when the first control signal is generated, if the buck-type voltage converter changes from a heavy load to a light load, a lower power tube in the buck-type voltage converter is controlled to be turned on; if the buck-type voltage converter changes from the light load to the heavy load, an upper power tube in the buck-type voltage converter is controlled to be turned on;

the compensation voltage predicting operation module comprises a transconductance amplifier, a first buffer, a second buffer, a first capacitor, a first switch, a second switch and a third switch;

a transconductance of the transconductance amplifier is adjustable, and a differential input voltage of the transconductance amplifier is a voltage divided value of a voltage difference between a voltage of a switching node at the buck-type voltage converter and the output voltage of the buck-type voltage converter, and an output end of the transconductance amplifier is connected to a first end of the first switch;

a first end of the second switch is connected to a second end of the first switch and an input end of the first buffer and is grounded through the first capacitor, and a second end of the second switch is connected to an output end of the second buffer;

a first end of the third switch is connected to an output end of the first buffer, and a second end of the third switch is connected to an input end of the second buffer and serves as an output end of the compensation voltage predicting operation module;

when the first control signal is generated, the first switch and the third switch are turned on and the second switch is turned off; when the first control signal is not generated, the first switch and the third switch are turned off and the second switch is turned on; and an input end of the internal active compensation module is connected to the output end of the compensation voltage predicting operation module, and an output end of the internal active compensation module is connected to an output end of an error amplifier in the buck-type voltage converter.

2. The transient response enhancement circuit for the buck-type voltage converter according to claim 1, wherein, the transient load changing detecting module also generates a second control signal when a decrease of the output voltage of the buck-type voltage converter is detected;

the transient response enhancement circuit further comprises a drive controlling insertion logic module; when the buck-type voltage converter is in a first control mode of periodically turning on the upper power tube, the drive controlling insertion logic module is configured to turn on the upper power tube in the buck-type voltage converter when the second control signal is generated; and when the buck-type voltage converter is in a second control mode of periodically turning on the lower power tube, the drive controlling insertion logic module is configured to turn on the lower power tube in the buck-type voltage converter when the second control signal is generated.

3. The transient response enhancement circuit for the buck-type voltage converter according to claim 1, wherein, the compensation voltage predicting operation module further comprises a voltage-dividing resistor, a first controllable current source and a second controllable current source;

a first end of the voltage-dividing resistor is connected to a bias voltage and a negative input end of the transconductance amplifier, and a second end of the voltage-dividing resistor is connected to a positive input end of the transconductance amplifier and is grounded through the first controllable current source;

a current value of the first controllable current source is $$\frac{VO-SW}{xR},$$

where, VO is the output voltage of the buck-type voltage converter, SW is the voltage at the switching node of the buck-type voltage converter, R is a resistance value of the voltage-dividing resistor, and x is a voltage-dividing ratio; and the second controllable current source is configured to adjust the transconductance of the transconductance amplifier.

4. The transient response enhancement circuit for the buck-type voltage converters according to claim 1, wherein the internal active compensation module is equivalent to a type II compensation structure including a compensation capacitor; the compensation capacitor has a variable farad value, wherein the variable farad value decreases when the first control signal is generated.

5. The transient response enhancement circuit for the buck-type voltage converters according to claim 2, wherein the internal active compensation module is equivalent to a type 11 compensation structure including a compensation capacitor; the compensation capacitor has a variable farad value, wherein the variable farad value decreases when the first control signal is generated.

6. The transient response enhancement circuit for the buck-type voltage converters according to claim 3, wherein the internal active compensation module is equivalent to a type H compensation structure including a compensation capacitor; the compensation capacitor has a variable farad value, wherein the variable farad value decreases when the first control signal is generated.

* * * * *